United States Patent
Kang

(10) Patent No.: US 8,970,807 B2
(45) Date of Patent: Mar. 3, 2015

(54) BACKLIGHT MODULE AND LIQUID CRYSTAL DISPLAY

(75) Inventor: Chihtsung Kang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 101 days.

(21) Appl. No.: 13/380,894

(22) PCT Filed: Dec. 1, 2011

(86) PCT No.: PCT/CN2011/083297
§ 371 (c)(1),
(2), (4) Date: Dec. 26, 2011

(87) PCT Pub. No.: WO2013/075348
PCT Pub. Date: May 30, 2013

(65) Prior Publication Data
US 2013/0135557 A1    May 30, 2013

(30) Foreign Application Priority Data
Nov. 25, 2011  (CN) .......................... 2011 1 0381898

(51) Int. Cl.
*G02F 1/1335* (2006.01)
*F21V 7/04* (2006.01)

(52) U.S. Cl.
USPC ............. 349/62; 362/608; 362/620; 362/621; 362/622

(58) Field of Classification Search
CPC .. G02B 6/0068; G02B 6/0038; G02B 6/0053; G02B 6/0036; G02B 6/002; G02B 6/0016; G02B 6/0035; G02B 6/0023; G02B 6/0025
USPC ............................................... 362/622
See application file for complete search history.

(56) References Cited

U.S. PATENT DOCUMENTS

| | | | |
|---|---|---|---|
| 6,778,241 B1 * | 8/2004 | Arai et al. ...................... | 349/114 |
| 7,182,499 B2 | 2/2007 | Chen et al. | |
| 7,387,423 B2 * | 6/2008 | Leu et al. ...................... | 362/627 |
| 7,686,495 B2 * | 3/2010 | Noba ............................ | 362/612 |

FOREIGN PATENT DOCUMENTS

| | | |
|---|---|---|
| CN | 1645215 | 7/2005 |
| CN | 201218442 | 4/2009 |

(Continued)

OTHER PUBLICATIONS

Wild, Peter, "Liquid Crystal Display Evolution—Swiss Contributions," 2012, IEEE Global History Network.*

(Continued)

*Primary Examiner* — Bumsuk Won
*Assistant Examiner* — Angela Davison

(57) ABSTRACT

Disclosed is a backlight module having light sources and a light guide plate, and the light guide plate has an incident side, and the lights emitted by the light sources pass through the incident side and enter into the light guide plate, and the a light direction changing layer is positioned at the incident side, and the light direction changing layer is employed for changing progress directions of the lights entering the incident side to shorten a distance perpendicular to the incident side from an intersection point of the lights emitted by adjacent light sources to the light sources. The present invention also discloses a liquid crystal display.

2 Claims, 4 Drawing Sheets

(56) References Cited

FOREIGN PATENT DOCUMENTS

| | | |
|---|---|---|
| CN | 202033494 | 11/2011 |
| JP | 2002116441 | 4/2002 |

OTHER PUBLICATIONS

Williams, Jim, "A Fourth Generation of LCD Backlight Technology," Nov. 1995, Linear Technology, Appendix B.*

* cited by examiner

BACKLIGHT MODULE AND LIQUID CRYSTAL DISPLAY

BACKGROUND OF THE INVENTION

1. Field of the Invention

The present invention generally relates to a liquid crystal display field, and more particularly to a backlight module and a liquid crystal display.

2. Description of Prior Art

With the population of the liquid crystal display, the demands for the display function of the liquid crystal display are getting higher and higher.

FIGS. 1A and 1B depict partial structure diagrams of a backlight module according to a prior art. Please refer to FIG. 1A. FIG. 1A shows a sectional diagram of the backlight module. As designing the light Emitting Diodes (LEDs) 11 and the light guide plate 12, the coupling efficiency of the lights emitted by the LEDs 11 including the coupling efficiency of the lights progressing from the LEDs 11 to the light guide plate (LGP) 12 has to be considered. Please refer to FIG. 1B. FIG. 1B is a sectional diagram of FIG. 1A. When the distance between the LEDs 11 and the light guide plate 12 is S1, all the lights emitted by the LEDs 11 can enter into the light guide plate 12.

Similarly, the distance perpendicular to the light guide plate 12 from the intersection point of the lights emitted by the adjacent LEDs 11 to the LEDs 11 also needs to be considered. For example, the lights emitted by the LEDs 11 enter the light guide plate 12 are illustrated in FIG. 1A. After the light emitted by one LED 11 enters into the light guide plate 12 and progresses a light coupling distance D1 in the direction B1 perpendicular to the incident side of the light guide plate 12, the light intersects with the light emitted by the adjacent LED 11. Therefore, the lights are emitted by the adjacent LEDs 11 and intersect, a dark area 13 is formed thereby and no light exist in the dark area 13.

Generally, the material of the light guide plate 12 is PMMA (Polymethylmethacrylate). Because the refractive index of the PMMA is larger than the refractive index of the air, the lights will be refracted toward the normal line L after the light emitted by the LED 11 progresses into the light guide plate 12 from the air. That is, the incidence angle θ1 is larger than the departure angle θ2 and the distance D1 (the light coupling distance) in the direction B1 perpendicular to the light guide plate 12 from the intersection point of the lights emitted by the adjacent LEDs 11 to the LEDs 11 becomes larger. Once the light coupling distance D1 becomes large enough to make the dark areas 13 occur in display area 14. The phenomenon of bright and dark mixing display can be happen on the liquid crystal panel.

For shortening the light coupling distance D1 to prevent the occurrence of dark areas 13 in the display area 14, a feasible method is to increase the distance between the LEDs 11 and the light guide plate 12. Please refer to FIG. 2A, the distance between the LEDs 11 and the light guide plate 12 is enlarged as S2 and S2>S1. Although the progressing path of the lights in the direction B1 perpendicular to the light guide plate 12 is longer to decrease the light coupling distance as D2 and D2<D1 to prevent the occurrence of dark areas 13 in the display area 14. However, please refer to FIG. 2B, which is a sectional diagram of FIG. 2A, not all the lights emitted by the LEDs 11 can enter the light guide plate 12. Accordingly, the coupling efficiency of the lights in the direction B1 perpendicular to the light guide plate 12 becomes descended.

In conclusion, it is a research and development aspect of the liquid crystal manufacture skill related with how to shorten a distance perpendicular to the light guide plate from an intersection point of the lights emitted by the adjacent LEDs to the LEDs and prevent the occurrence of dark areas in the display area of the liquid crystal panel as the lights of the LEDs intersect for guaranteeing the display quality of the liquid crystal panel.

SUMMARY OF THE INVENTION

An objective of the present invention embodiments is to provide a backlight module to shorten a distance perpendicular to the incident side from an intersection point of the lights emitted by the adjacent LEDs to the LEDs to prevent the occurrence of dark areas in the display area of the liquid crystal panel as the lights of the LEDs intersect and to guarantee the display quality of the liquid crystal panel.

For achieving the aforesaid beneficial effect, the present invention constructs a backlight module having light sources and a light guide plate, and the light guide plate has an incident side with a first refractive index, and the lights emitted by the light sources pass through a medium and the incident side and enter into the light guide plate, and the medium has a third refractive index;

a distance between the light source and a light direction changing layer is a light coulping distance, and the light coulping distance is a predetermined distance for all the lights emitted by the light sources to enter into the light direction changing layer;

the light direction changing layer is positioned at the incident side, and the light direction changing layer has a second refractive index, and the second refractive index is smaller than the first refractive index and larger than the third refractive index; the light direction changing layer is employed for changing progress directions of the lights entering the incident side to shorten a distance perpendicular to the incident side from an intersection point of the lights emitted by adjacent light sources to the light sources.

In the backlight module of the present invention, the light direction changing layer is a transparent film, and material of the transparent film is silicon dioxide or calcium fluoride.

In the backlight module of the present invention, the transparent film is coated on the incident side of the light guide plate.

Another objective of the present invention is to provide a backlight module to shorten a distance perpendicular to the incident side from an intersection point of adjacent LEDs to the LEDs to prevent the occurrence of dark areas in the display area of the liquid crystal panel as the lights of the LEDs intersect and to guarantee the display quality of the liquid crystal panel.

For attaining the aforesaid beneficial effect, the present invention constructs having light sources and a light guide plate, and the light guide plate has an incident side, and the lights emitted by the light sources pass through the incident side and enter into the light guide plate;

a light direction changing layer is positioned at the incident side, and the light direction changing layer is employed for changing progress directions of the lights entering the incident side to shorten a distance perpendicular to the incident side from an intersection point of the lights emitted by adjacent light sources to the light sources.

In the backlight module of the present invention, a distance between the light source and a light direction changing layer is a light coulping distance, and the light coulping distance is a predetermined distance for all the lights emitted by the light sources to enter into the light direction changing layer.

In the backlight module of the present invention, the light guide plate has a first refractive index, and the lights emitted by the light sources pass through a medium and enter into the light guide plate, and the medium has a third refractive index; the light direction changing layer has a second refractive index, and the second refractive index is smaller than the first refractive index and larger than the third refractive index.

In the backlight module of the present invention, the light direction changing layer is a transparent film, and material of the transparent film is silicon dioxide or calcium fluoride.

In the backlight module of the present invention, the transparent film is coated on the incident side of the light guide plate.

Another objective of the present invention is to provide a liquid crystal display, and the liquid crystal display comprises a backlight module having light sources and a light guide plate, and the light guide plate has an incident side, and the lights emitted by the light sources pass through the incident side and enter into the light guide plate;

a light direction changing layer is positioned at the incident side, and the light direction changing layer is employed for changing progress directions of the lights entering the incident side to shorten a distance perpendicular to the incident side from an intersection point of the lights emitted by adjacent light sources to the light sources.

In the liquid crystal display of the present invention, a distance between the light source and a light direction changing layer is a light coulping distance, and the light coulping distance is a predetermined distance for all the lights emitted by the light sources to enter into the light direction changing layer.

In the liquid crystal display of the present invention, the light guide plate has a first refractive index, and the lights emitted by the light sources pass through a medium and enter into the light guide plate, and the medium has a third refractive index; the light direction changing layer has a second refractive index, and the second refractive index is smaller than the first refractive index and larger than the third refractive index.

In the liquid crystal display of the present invention, the light direction changing layer is a transparent film, and material of the transparent film is silicon dioxide or calcium fluoride.

In the liquid crystal display of the present invention, the transparent film is coated on the incident side of the light guide plate.

Comparing with prior arts, the present invention positions a light direction changing layer at the incident side, and the refractive index of the light direction changing layer is smaller than the refractive index of the light guide plate and a light coulping distance between the light source and a light direction changing layer is a predetermined distance. Accordingly, the lights emitted by the light sources enter the light guide plate before they are refracted by the light direction changing layer. Because the light coulping distance is the predetermined distance, all the lights emitted by the light sources can enter into the light guide plate. The coupling efficiency on the direction perpendicular to the light guide plate is well guaranteed; furthermore, a distance perpendicular to the incident side from an intersection point of the lights emitted by adjacent light sources to the light sources is shortened. Therefore, the occurrence of the dark areas in the display area of the liquid crystal panel can be effectively prevented and the display quality of the liquid crystal panel can be ensured.

For a better understanding of the aforementioned content of the present invention, preferable embodiments are illustrated in accordance with the attached figures for further explanation:

DETAILED DESCRIPTION OF THE INVENTION

The following clear and full descriptions for the respective embodiments are specific embodiments capable of being implemented for illustrations of the present invention with referring to appended figures.

Figure 3:
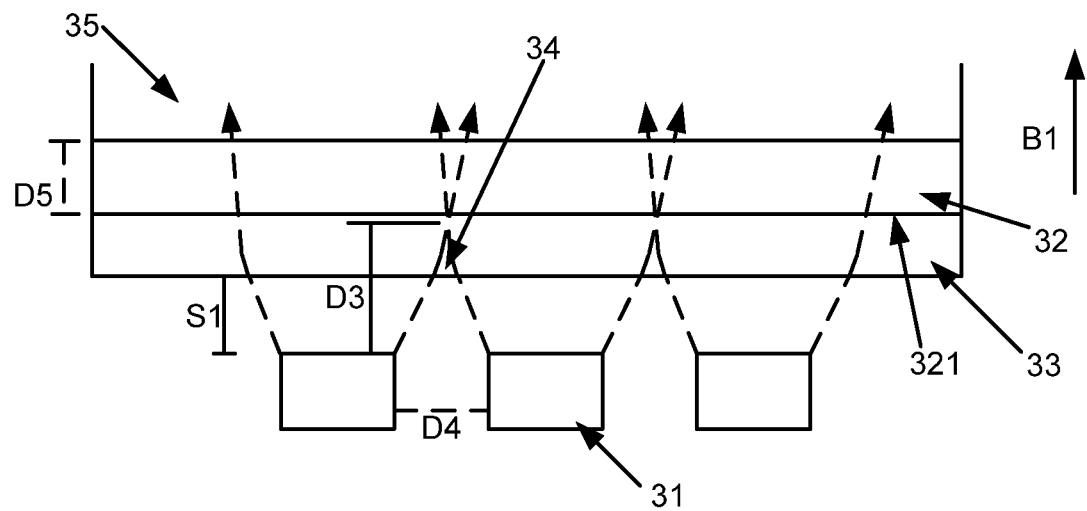
FIG. 3 depicts a structure diagram of a preferable embodiment according to the present invention.

FIG. 3 depicts a structure diagram of a preferable embodiment according to the present invention. The backlight module has a light source 31 and a light guide plate 32. The light guide plate 32 has an incident side 321. A light direction changing layer is positioned at the incident side 321. The light direction changing layer is employed for changing progress directions of the lights entering the incident side to shorten a distance in a direction B1 perpendicular to the incident side 321 from an intersection point of the lights emitted by adjacent light sources 31 to the light sources 31.

As mentioning "shortening distance" in this embodiment, it refers to a distance between the intersection point of the lights emitted by the adjacent light sources 31 and the light sources 31 in a direction B1 perpendicular to the incident side 321. Comparing to the prior arts, the distance can be shortened, such as two millimeters. Please refer the contents hereafter for details.

As being a preferable embodiment, the light direction changing layer is a refracting layer 33. Certainly, the light direction changing layer also can be a scattering layer if only the progress directions of the lights can be changed and the distance of the intersection point of the lights emitted by adjacent light sources 31 in a direction B1 perpendicular to the incident side 321 can be shortened. Here, the enumerations therefor are omitted.

Preferably, the light sources 31 are LEDs. Certainly, the light sources 31 can be other illuminants. The refracting layer 33 is a transparent film, and material of the transparent film is silicon dioxide or calcium fluoride.

In one specific embodiment, the refracting layer 33 is laminated to the incident side 321 of the light guide plate 32. More preferably, the refracting layer 33 as a transparent film can be coated on the incident side 321 of the light guide plate 32. Certainly, other methods also can be illustrated and the enumerations therefor are omitted here.

The light guide plate has a first refractive index $n1$. The medium has a third refractive index. The refracting layer 33 has a second refractive index $n2$. The lights emitted by the light sources 31 pass through a medium and enter into the light guide plate 32. The medium has a third refractive index $n3$. The second refractive index $n2$ is smaller than the first refractive index $n1$ and larger than the third refractive index $n3$.

For instance, the medium is air and the refractive index is 1.0; the material of the light guide plate 32 is Polymethylmethacrylate and the refractive index of the light guide plate 32 is 1.49; as the material of the refracting layer 33 is silicon dioxide, the refractive index of the refracting layer 33 is 1.45. Certainly, the refracting layer 33 also can be made by other materials if only the refractive index n2 of the refracting layer 33 is smaller than the refractive index n1 of the light guide plate 32. Here, the enumerations therefor are omitted.

For instance, as the material of the refracting layer 33 is silicon dioxide, the refractive index of the refracting layer 33 is 1.45; as the material of the refracting layer 33 is calcium fluoride, the refractive index of the refracting layer 33 is 1.33.

Figure 4:
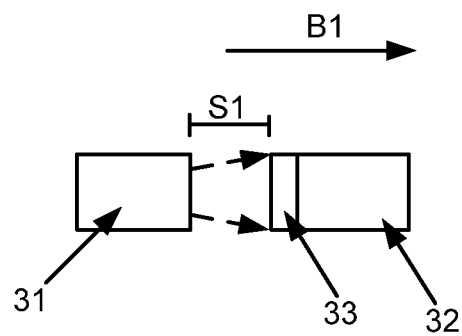
FIG. 4 depicts a sectional diagram of FIG. 3.

Please refer to FIG. 4. The distance between the light sources 31 and the refracting layer 33 is a light coupling distance. The light coupling distance is a predetermined distance. As the light coupling distance is the distance indicated by S1 shown in FIG. 4, all the lights emitted by the light sources 31 can enter the refracting layer 33 and the light coupling efficiency of the lights in the direction B1 perpendicular to the incident side 32 can be guaranteed.

Figure 5:
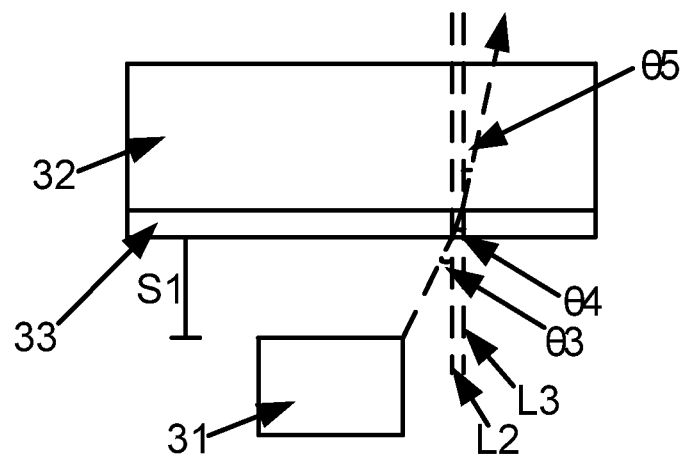
FIG. 5 depicts a diagram of the light progress directions shown in FIG. 3.

The functional principle of the backlight module according to the preferable embodiment of the present invention is introduced hereafter:

Please refer to FIG. 3, FIG. 4 and FIG. 5. The lights emitted by the light sources 31 pass through the medium and then arrive and enter into the refracting layer 33. Because the second refractive index n2 of the refracting layer 33 is larger than the third refractive index n3 of the medium, the progress direction of the light is changed toward a first normal line L2 after the light progresses and enters into the refracting layer 33. Namely, the first incidence angle θ3 of the light is larger than the second incidence angle θ4 which the light enters into the light guide plate with.

The light entering into the refracting layer 33 keeps progressing and enters the light guide plate 32. Because the second refractive index n2 of the refracting layer 33 is smaller than the first refractive index n1 of the light guide plate 32, the progress direction of the light is changed toward a second normal line L3 after the light progresses and enters into the light guide plate 32. Therefore, the second incidence angle θ4 which the light enters into the light guide plate 32 with is larger than the second departure angle θ5.

Figure 1A:
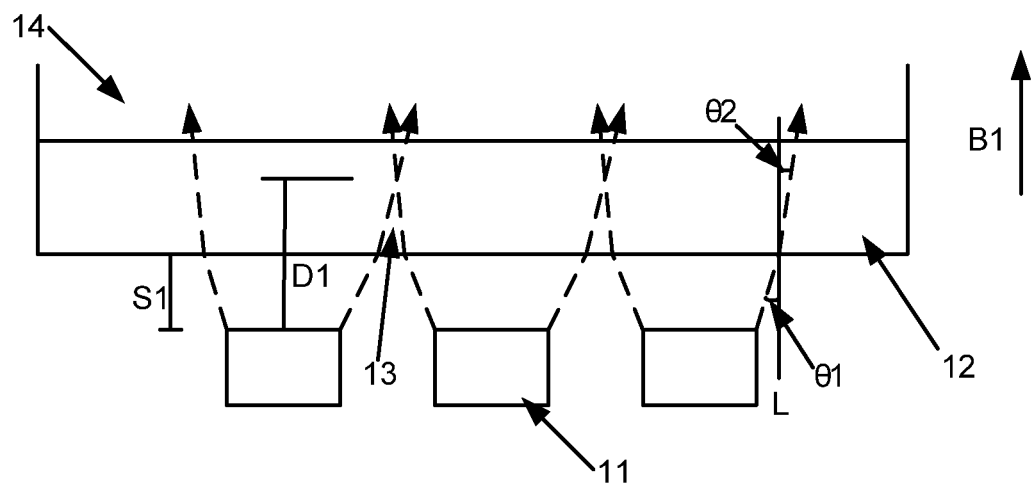
FIGS. 1A and 1B depict partial structure diagrams of a backlight module according to a prior art.
Figure 1B:
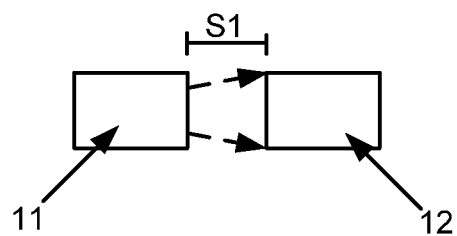
Figure 2A:
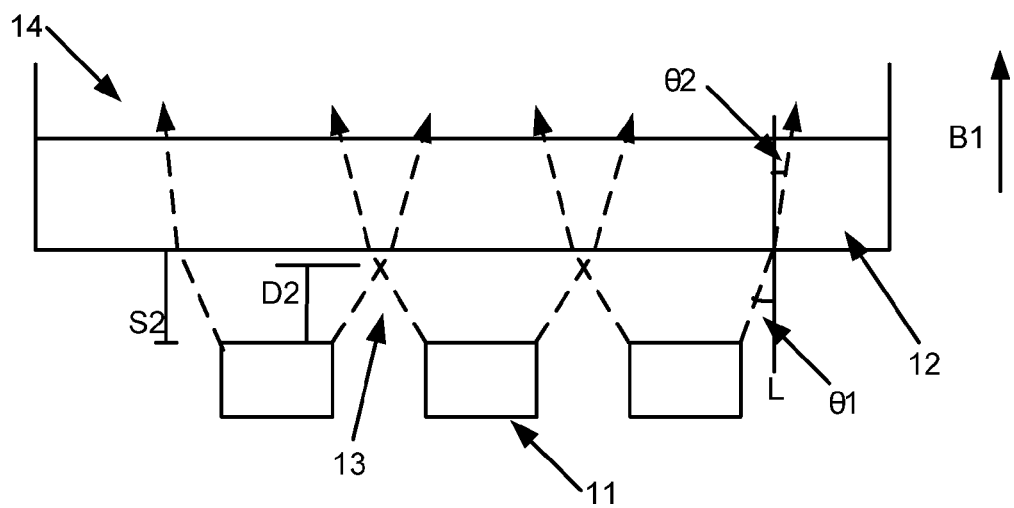
FIGS. 2A and 2B depict structure diagrams in which a distance between the LEDs and the light guide plate shown in FIGS. 1A and 1B is changed.
Figure 2B:
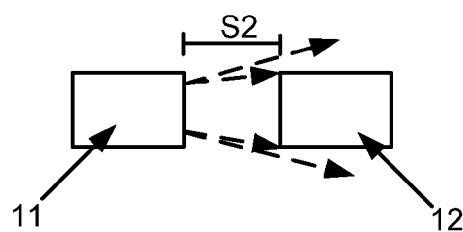

Apparently, comparing with the light directly entering the light guide plate 12 shown in FIG. 1, in this embodiment, the light passes through the refracting layer 33 which the refractive index is smaller than the refractive index of the light guide plate 12 for refracting the light before entering the light guide plate 32 and a light coulping distance S1 is maintained between the light source 31 and the refracting layer 33. Therefore, the light enters into the light guide plate 32 after being refracted by the refracting layer 33. The distance in the direction B1 perpendicular to the incident side 321 from the intersection point of the lights emitted by the adjacent LEDs 31 to the LEDs 31 is apparently shortened as D3. The light coulping distance D3 in this embodiment is smaller than the light coulping distance D1 shown in FIG. 1, i.e. D3<D1 and the difference is D1-D3. Accordingly, the present invention is capable of effectively preventing the occurrence of the dark area 34 in the display area 35 of the liquid crystal panel as the lights of the LEDs 31 intersect and still remains the light coulping distance as S1 for allowing all the lights emitted by the light sources 31 entering the into the refracting layer 33. The coupling efficiency of the lights in the direction B1 perpendicular to the incident side 321 can be ensured and the display quality of the liquid crystal panel can be guaranteed.

Furthermore, in the embodiment, the distance in the direction B1 perpendicular to the incident side 321 from the intersection point of the lights emitted by the adjacent light sources 31 to the light sources 31 is shortened as D3, even the space D4 between adjacent light sources 31 are wider, the occurrence of the dark area 34 in the display area 35 of the liquid crystal panel as the lights of the light sources 31 intersect still can be prevented. Accordingly, the present invention is capable of decreasing the amount of the light sources 31 and save the cost.

Moreover, the distance in the direction B1 perpendicular to the incident side 321 from the intersection point of the lights emitted by the adjacent light sources 31 to the light sources 31 is shortened as D3, in comparison with the display area 14 of the prior art, the area of the display area 35 can be tremendously increased according to this embodiment. That is, the occurrence of the dark area 34 in the display area 35 of the liquid crystal panel as the lights of the light sources 31 intersect can be similarly prevented, even the thickness D5 required in the frame edge design of the light guide plate 32 for guaranteeing the light coupling is diminished. Accordingly, the narrow frame design can be realized and the occupied space of the liquid crystal panel can be decreased for saving the cost.

The present invention also provides a liquid crystal display. The liquid crystal display comprises the backlight module provided by the present invention as aforementioned with detail description. Here, repeat is no more.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A backlight module, having light sources and a light guide plate, and the light guide plate has an incident side with a first refractive index, and the lights emitted by the light sources pass through a medium and the incident side and enter into the light guide plate, and the medium has a third refractive index, characterized in that:
   a distance between the light source and a light direction changing layer is a light coupling distance, and the light coupling distance is a predetermined distance for all the lights emitted by the light sources to enter into the light direction changing layer;
   the light direction changing layer is positioned at the incident side and is laminated to the incident side of the light guide plate, and the light direction changing layer has a second refractive index, and the second refractive index is smaller than the first refractive index and larger than the third refractive index; wherein the light direction changing layer is a transparent film, and material of the transparent film is silicon dioxide or calcium fluoride, and the light direction changing layer is employed for changing progress directions of the lights entering the incident side to shorten a distance perpendicular to the incident side from an intersection point of the lights emitted by adjacent light sources to the light sources.

2. The backlight module according to claim 1, characterized in that the transparent film is coated on the incident side of the light guide plate.

* * * * *